March 3, 1959 J. KILBOURNE 2,875,885
SLACK TAKE UP MEANS FOR CONVEYOR
Filed March 4, 1957 4 Sheets-Sheet 1

INVENTOR,
JAMES KILBOURNE,
BY David Young
ATTY.

INVENTOR:
JAMES KILBOURNE,
BY David Young
ATT'Y.

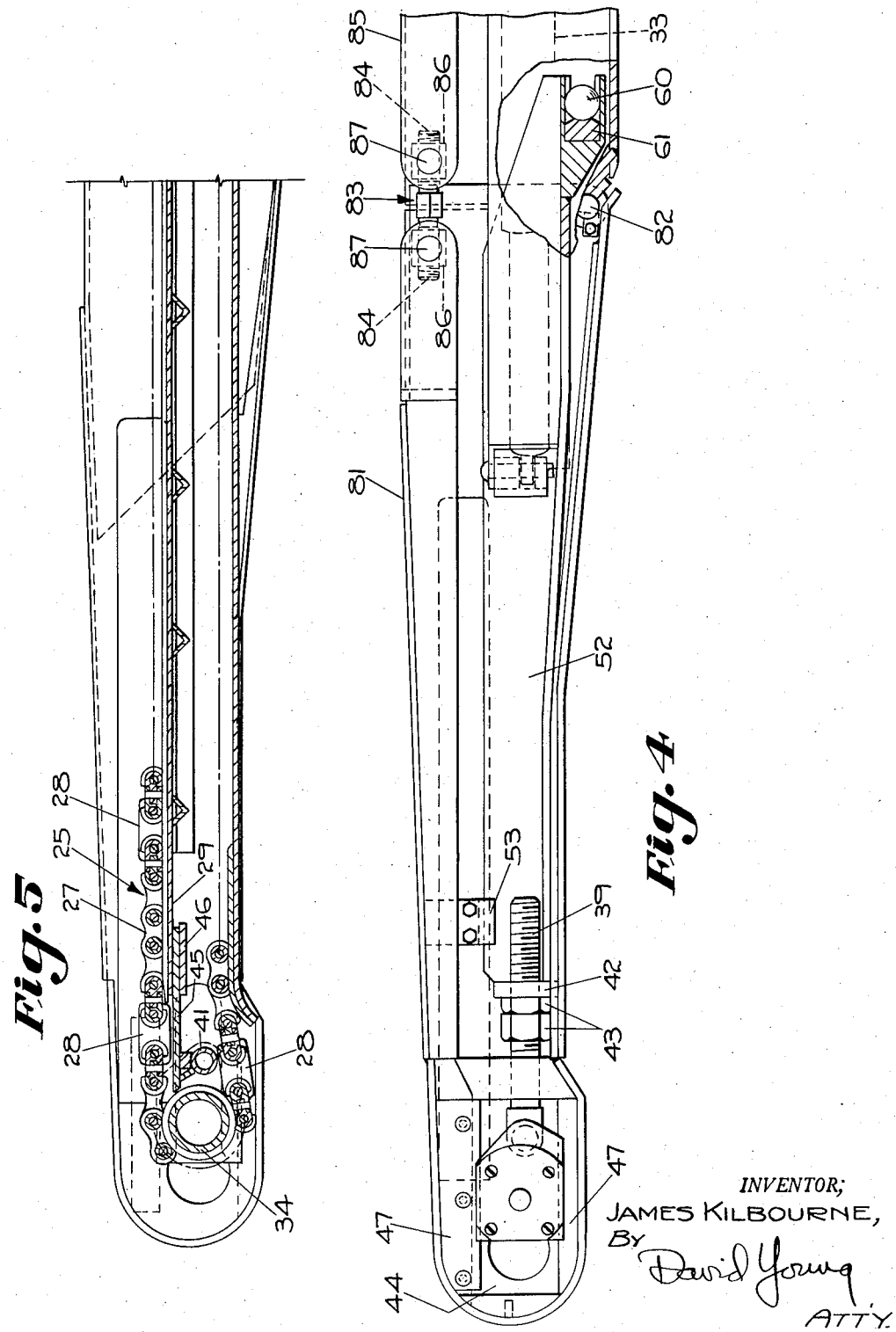

March 3, 1959 J. KILBOURNE 2,875,885
SLACK TAKE UP MEANS FOR CONVEYOR
Filed March 4, 1957 4 Sheets-Sheet 4
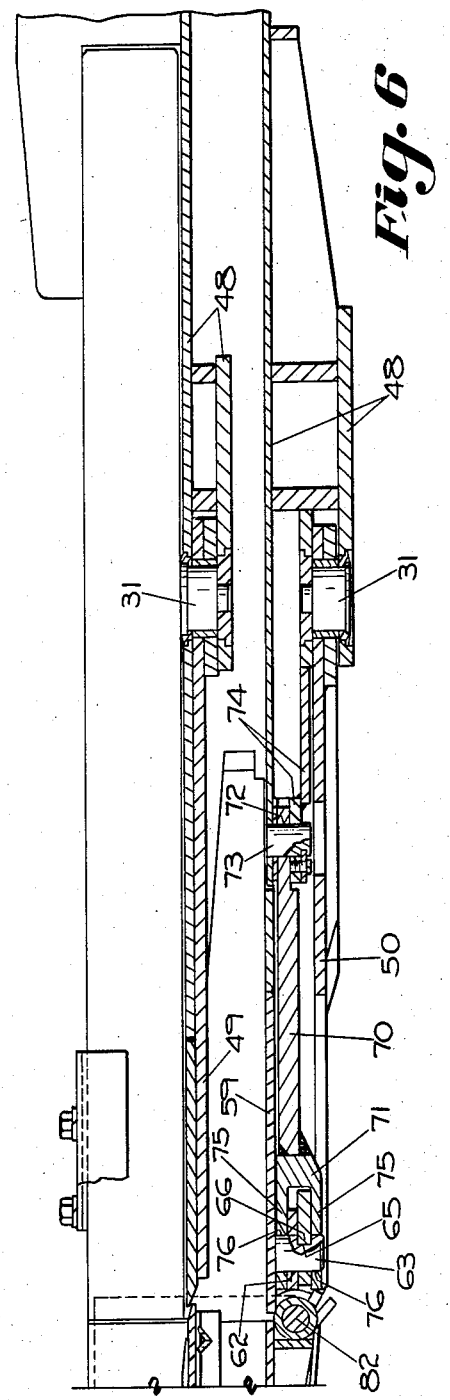
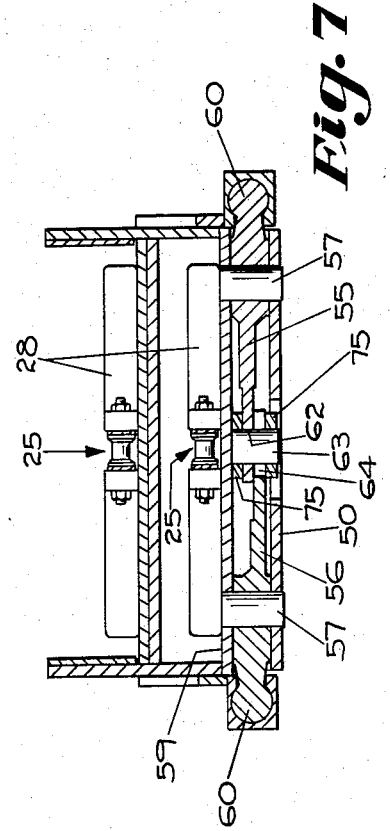
*INVENTOR:*
JAMES KILBOURNE,
BY David Young
ATT'Y.

United States Patent Office 2,875,885
Patented Mar. 3, 1959

2,875,885
SLACK TAKE UP MEANS FOR CONVEYOR

James Kilbourne, Bexley, Ohio, assignor to The Jeffrey Manufacturing Company, a corporation of Ohio Application March 4, 1957, Serial No. 643,834

15 Claims. (Cl. 198—109)

The instant invention relates to material loading machines and, more particularly, to an improvement in the conveyor of such a machine.

It is the prime object of the invention to provide an improved material loading machine having a conveyor for moving the material and a material discharge boom which is adapted to swing to one side or the other with respect to the main frame of the machine.

It is another object of this invention to provide an improved material loading machine having a material discharge boom which is adapted to swing to one side or the other with respect to the main frame of the machine, and including conveyor means having its run extending along the main frame of the machine and the discharge boom, and being provided with means on the discharge boom to take up slack in the conveyor means to maintain the tension in the conveyor means as the discharge boom is swung from side to side.

It is a further object of the instant invention to provide an improved conveyor having a pivot section, which is adapted to swing to one side or the other with respect to the main frame of the conveyor, and including means on the pivot section to take up slack in the conveying element to maintain the tension in the conveying element as the pivot section is swung relatively to the main frame.

It is still another object of the instant invention to provide an improved conveyor having a pivot section which is connected to the main frame of the conveyor on a pivot axis to permit the pivot section to swing to one side or the other relative to the conveyor main frame, and in which the conveying element has its run intersecting the pivot axis, whereby the path of the conveying element is shortened as the pivot section is swung, and including means in the pivot section to automatically take up slack in the conveying element to maintain the tension in the conveying element as the pivot section is swung.

It is also an object of the instant invention to provide an improved conveyor having a pivot section which is adapted to swing relatively to the main frame of the conveyor, in which the pivot section includes an adjustably mounted shaft about which a conveying element is trained, and means for automatically adjusting the shaft as the pivot section is swung relatively to the main frame to take up slack in the conveying element to maintain the tension in the conveying element.

It is yet another object of the instant invention to provide an improved conveyor having a pivot section which is adapted to swing relatively to the main frame of the conveyor, the pivot section including a tail portion connected on a horizontal axis for adjustment in a vertical plane, with means on the tail portion for adjusting the conveying element as the pivot section is swung relatively to the main frame, and operating means connected to the adjusting means by a universal type connection to permit adjustment of the pivot section tail portion.

Other objects of the invention will appear hereinafter, the novel features and combinations being set forth in the appended claims.

In the accompanying drawings:

Fig. 4 is a side elevational view of a portion of the discharge boom;

Fig. 5 is a vertical sectional view taken at the center of the discharge boom;

Fig. 6 is a vertical sectional view showing the pivot connection of the discharge boom to the main frame of the machine, and certain details of the slack take up means, taken on the line 6—6 in Fig. 2; and Fig. 7 is a vertical sectional view of the discharge boom, taken on the line 7—7 in Fig. 2.

The instant invention relates to material loading machines of a type which is primarily intended for use in mining operations to remove material from the floor of the mine and to discharge it onto a shuttle car, a conveyor belt, or other conveyance for carrying the material out of the mine. In the illustrated embodiment of the invention the loading machine includes motive means for transporting the machine or advancing the machine during the loading operation. The machine additionally includes means at the front end of the machine for gathering the material from the floor of the mine into the machine, and conveying means for carrying the material rearwardly of the machine to a discharge boom which is elevated above the floor of the mine to discharge the material onto a conveyance for removal of the material from the mine. The discharge boom of the machine is connected to the machine on a pivot axis so that it may swing to one side or the other of the machine to control the discharge of the material. The instant invention provides an improvement in the conveying means of the loading machine, comprising a novel structure for taking up slack in the conveying element to maintain the tension in the conveying element as the discharge boom is swung to one side or the other during the course of operation of the loading machine.

Figure 1:
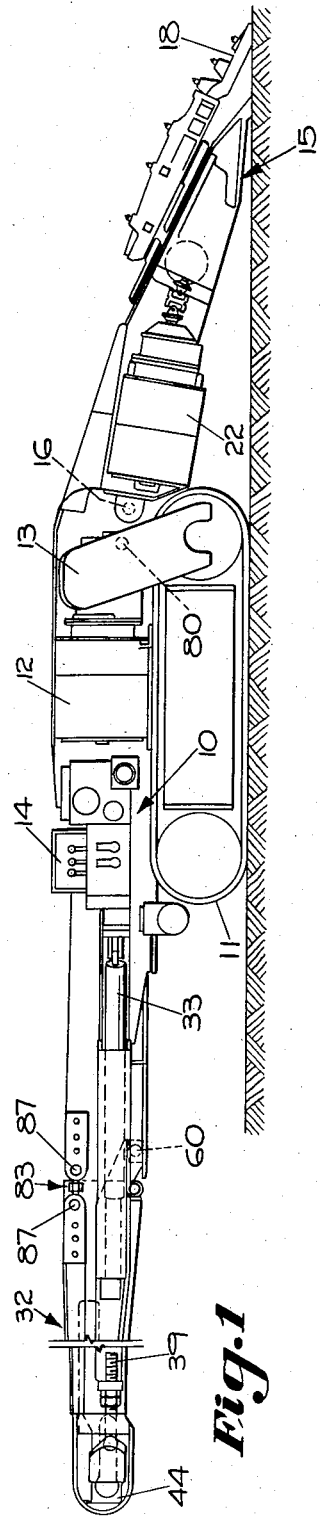
Fig. 1 is a side elevational view of a material loading machine constructed in accordance with the instant invention.
Figure 2:
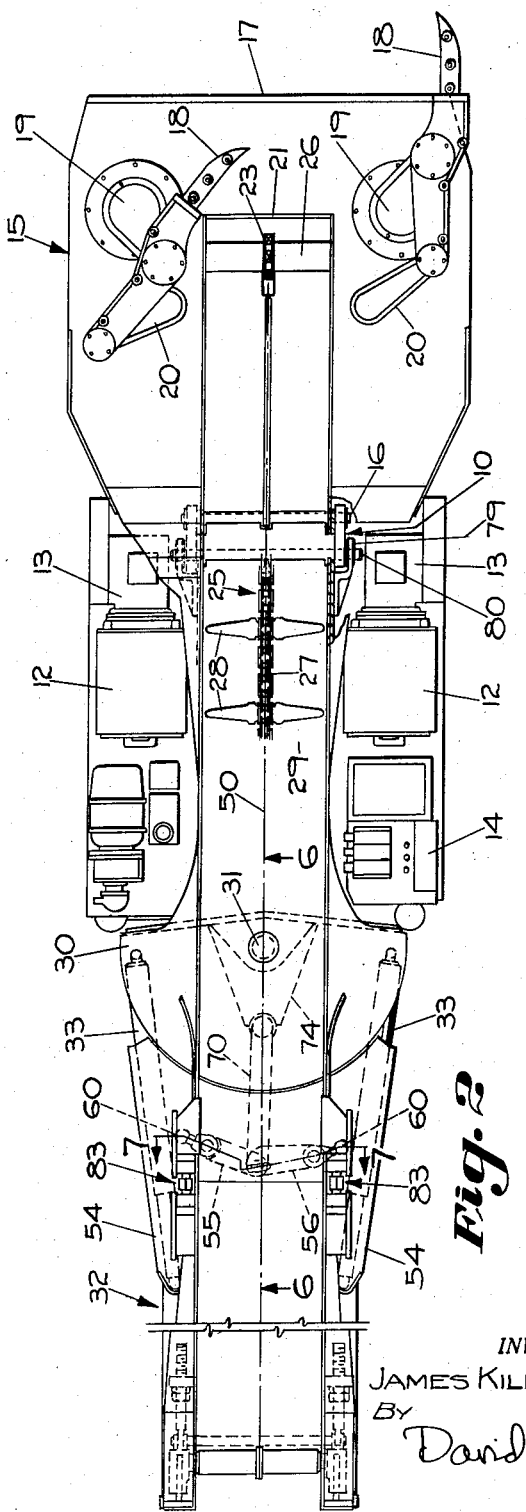
Fig. 2 is a top plan view of the material loading machine illustrated in Fig. 1.

Referring to the drawings, and particularly to Figs. 1 and 2, there is illustrated a material loading machine constructed in accordance with the instant invention. The loading machine includes a main frame 10, provided with endless crawler traction means 11 which are operative to drive the machine in moving from one operating location to another, or in advancing the machine during the course of the loading operation. The crawler traction means 11 on either side of the machine are independently driven from motors 12 supported on the main frame 10, and connected to the traction means 11 by suitable transmission devices 13 which may be of a conventional form. The various mechanisms of the loading machine are all controlled from an operating station 14 located near the rear of the main frame 10.

The front end of the loading machine is provided with material receiving means 15 swingably mounted on the main frame 10 on a horizontally disposed hinge shaft 16 for vertical adjustment of the material receiving means 15 according to the grade of the mine floor. The material receiving means 15 is formed with a dozer blade 17 at its front edge which scrapes along the floor of the mine and provides a path for the materials on the mine floor leading to the material receiving means. There is additionally provided a pair of gathering arms 18 disposed one at either side of the material receiving means 15, each driven by a rotating crank 19 and guided by a swivel arm 20 in a somewhat oscillating and sweeping path from the sides of the dozer blade 17 in towards the center of the blade 17 and upwardly towards the mouth 21 of the material receiving means 15, to deliver the materials thereto.

Within the mouth 21 there is disposed one end of an endless conveying element 25 which extends the length of the material loading machine. The conveying element 25 is trained about a drive shaft 26 which is disposed within the mouth 21 of the material receiving means 15. The shaft 26 is connected by gearing to the power driving means for the cranks 19, and is operative to drive the conveying element 25 by means of a sprocket 23, at the same time as the gathering arms 18 are operated. A pair of motors 22, located one at either side of the material receiving means 15, are operative to drive the gathering arms 18 and the conveyor shaft 26 through suitable transmission devices, which may be of a conventional form.

The conveying element 25 includes a centrally disposed universal link chain 27 having the links connected for relative movement in planes at right angles to each other, and includes a plurality of transversely extending flights 28 at spaced intervals along the length of the chain 27, and extending to either side of the chain 27. The run of the conveying element 25 extends along the length of the loading machine and travels over a bed 29, over which it moves the material from the front receiving end of the machine to the rear discharge end of the machine.

At the rear of the main frame 10 the bed 29 is formed with a flared portion 30 having the configuration of a portion of a circle. At the center of the flared bed portion 30 there is provided a two-part pivot pin 31, which pivotally connects the discharge boom 32 to the main frame 10 of the machine on an upright axis, to provide for swinging movement of the discharge boom 32 relatively to the main frame. The discharge boom 32 thereby forms a pivot section of the conveyor in the machine, which is adapted to swing laterally relatively to the main frame 10. Main frame plate members 48 form rearward extensions of the main frame 10 and provide upper and lower supports for the two-part pivot pin 31. The discharge boom 32 is pivotally connected to the main frame 10 by a top plate member 49 and a bottom plate member 50, each of which is pivotally connected on the two-part pivot pin 31.

As the discharge boom 32 is swung laterally from one side to another of its normal position, in which it forms a straight line extension of the main frame 10 of the machine, it will be seen that the conveyor bed 29 is unbroken by virtue of the flared bed portion 30, which forms a smooth uninterrupted continuation of the conveyor bed in all lateral positions of the discharge boom 32. The discharge boom 32 is swung relatively to the main frame 10 by a pair of hydraulic cylinder and piston motors 33 located one on either side of the machine at the rear of the main frame 10. One end of each hydraulic motor is connected to the main frame 10 below the enlarged bed portion 30, and the opposite end of each hydraulic motor 33 is connected to the discharge boom 32, on an extension 54 of the bed 29 formed on each side of the discharge boom 32. To swing the discharge boom 32, one of the hydraulic motors is expanded and the other contracted, as illustrated in Fig. 3, it being understood that conventional hydraulic control means is provided to achieve this operation.

The end of the discharge boom 32 is provided with an idler shaft 34 about which the conveying element 25 is trained. Each end of the idler shaft 34 is journaled in an antifriction bearing 35 supported within a bearing housing 36. Each bearing housing 36 is formed with a clevis 37 extending in the direction of the main frame 10 and receiving between the arms thereof a flattened end 38 of an adjusting screw 39. A pin 40 is inserted through apertures in the arms of the clevis 37 and through the end 38 of the adjusting screw 39, to secure the adjusting screw 39 to the assembly of the shaft 34 and the bearing housings 36. The ends of the pins 40 are seated in a hollow, cylindrical, transverse frame member 41. Each of the adjusting screws 39 extends parallel to the discharge boom 32 and passes freely through a bore in an upstanding lug 42 at the end of push rod 52. The adjusting screws 39 are utilized for adjusting the position of the shaft 34, and this is achieved by use of nuts 43 threaded on each of the adjusting screws 39 and bearing against the lug 42 on each push rod 52, it being understood that a pair of nuts 43 is utilized on each adjusting screw in order to lock the screws 39 in adjusted position. The adjusting screws 39 are utilized initially to set the shaft 34 for proper tension in the conveying element 25, and as the conveying element 25 wears during the life of the loading machine, the adjusting screws 39 may be utilized to reposition the shaft 34 and to restore the conveying element 25 to proper tension.

The bearing housings 36 which support the opposite ends of the shaft 34 are each slidably supported on the end of the discharge boom in a slot 44 formed between upper and lower bars 47, which permits the above-described adjustment of the shaft 34. Secured to the transverse frame member 41 is a relatively short plate 45 forming an extension of the conveyor bed 29, and slidably supported between the conveyor bed 29 and a supporting plate 46. The transverse frame member 41, being connected to slidable shaft 34 assembly by pins 40, moves with the shaft 34 when the latter is adjusted, and accordingly, the extension plate 45 will be similarly moved to provide an uninterrupted extension of the conveyor bed 29.

Figure 3:
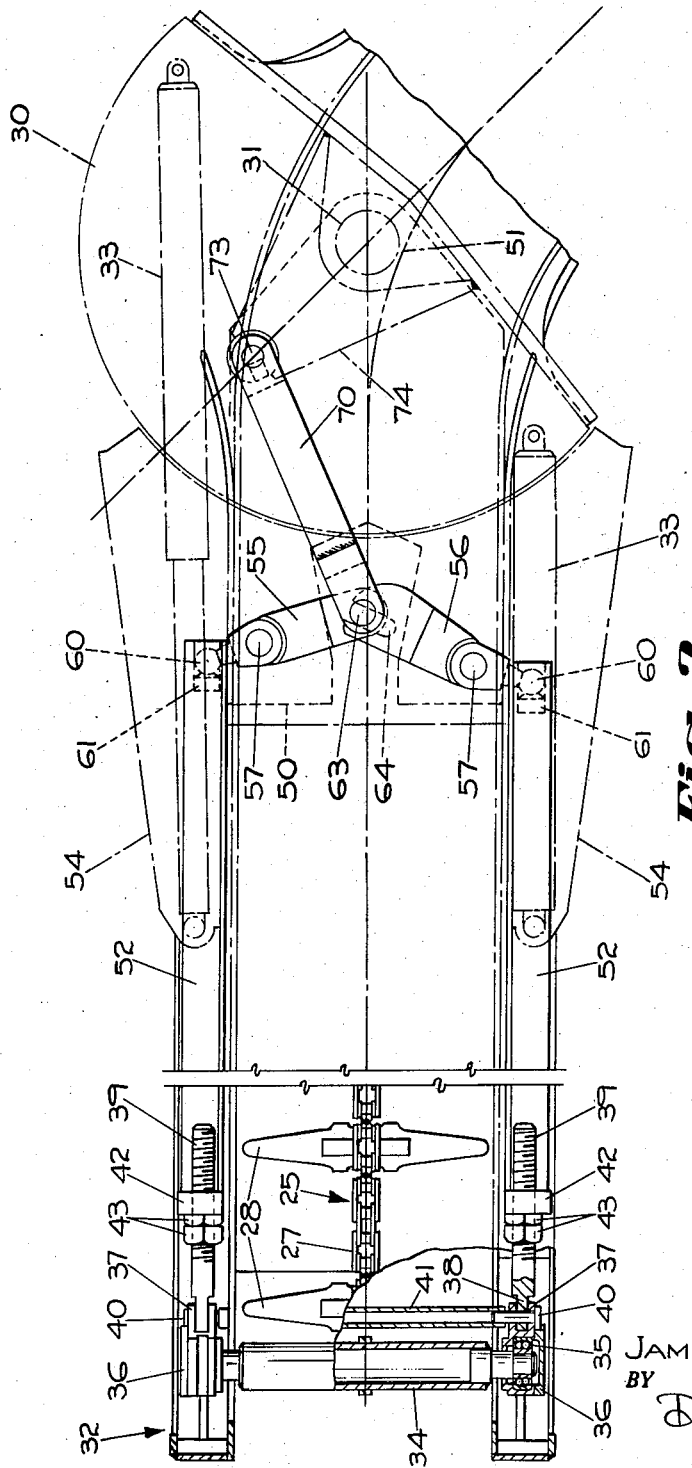
Fig. 3 is a bottom plan view of the discharge boom, with the discharge boom swung to one side of the main frame and showing certain details of the conveying element slack take up means.

Referring to Figs. 2 and 3, it is seen that when the discharge boom 32 is aligned with the main frame 10 to form a straight line extension thereof, the run of the conveying element 25 intersects the axis of the pivot pin 31. However, when the discharge boom 32 is swung laterally relatively to the main frame 10, the run of the conveying element 25 assumes a curved path 51 which is spaced to one side of the axis of the pivot pin 31. In this condition the run of the conveying element 25 is shortened, as is apparent from a consideration of the geometry of the system. Accordingly, slack will be introduced into the conveying element 25, and for the conveying element 25 to operate most efficiently, this slack must be taken up to maintain the proper tension in the conveying element 25.

For the purpose of taking up the slack in the conveying element 25 the adjusting screws 39 are mounted in apertured lugs 42, formed one on the end of each of a pair of push rods 52, disposed one at either side of the discharge boom 32, with the lock nuts 43 bearing against the lugs 42. The push rods 52 are each slidably mounted on the discharge boom 32 by means of a bracket 53, which secures the push rods 52 for reciprocation in a direction parallel to the run of the conveying element 25. In order to take up the slack occurring in the conveying element 25 when the discharge boom 32 is swung to one side or the other laterally of the main frame 10 of the loading machine, the push rods 52 are reciprocated in unison towards the end of the discharge boom 32, with the lugs 42 bearing against the nuts 43 on the adjusting screws 39, thereby effecting an adjustment of the idler shaft 34.

The instant invention provides a mechanism for automatically reciprocating the push rods 52 as the discharge boom 32 is swung to one side or the other of the main frame 10 of the loading machine. This mechanism comprises a pair of oppositely directed cranks 55, 56 each mounted on the discharge boom 32 for oscillation on an individual pivot pin 57. The ends of each pivot pin 57 are seated in the bottom plate 50 and the center plate 59, it being noted that the center plate 59 provides a surface for supporting the return run of the conveying element (Fig. 7). The outboard end of each crank 55, 56 is formed with a ball connector 60 which is seated on a spherical seat 61 on the end of the push rod 52, to form a ball and socket type joint, whereby oscillatory motion of the cranks 55, 56 is transmitted to the push rods 52, which are thereby caused to reciprocate parallel to the run of the conveying element 25.

The inboard end of the crank 55 is formed with an aperture 62 which receives a connecting pin 63. The inboard end of the crank 56 is formed with an open ended slot 64 which is narrower than the diameter of the pin 63. The pin 63 has a notch 65 cut along a chord of the pin cross-section, of such width as to fit the crank 56. The pin 63 is fitted into the slot 64 of the crank 56, with the notch 65 in engagement with the straight edge 66 of the slot 64. The pin 63 is thereby retained in assembly with the cranks 55, 56, and is locked by engagement of the notch 65 with the edge 66 of the slot 64 in the crank 56. The position of the pin 63 is fixed relatively to the crank 55, since it is contained within the aperture 62, which fits the diameter of the pin 63. However, the pin 63 may slide relatively to the crank 56 since, with respect to the crank 56, the pin 63 is mounted within the slot 64. Thus, as the cranks 55, 56 are oscillated in the course of operation, they may contract and expand, that is to say the sum of the lengths from the two pivot pins 57 to the connecting pin 63 may increase and decrease.

An actuating link 70 extends from the main frame 10 to the cranks 55, 56 on the discharge boom. The end of the actuating link 70 at the cranks 55, 56 is formed with a clevis 71, the arms 75 of which each includes an aperture 76 for the reception of the pin 63, with the inboard ends of the cranks 55, 56 being disposed between the arms 75 of the clevis 71, as seen in Fig. 6. The opposite end of the actuating link 70 is formed with an aperture 72 for the reception of a pin 73, secured to the main frame 10 by frame members 74. The actuating link 70, through its connection with the cranks 55, 56 by the pin 63, is operative to oscillate the cranks 55, 56 on their pins 57 to operate the push rods 52 to take up the slack in the conveying element 25, as is explained in detail hereinafter.

The pin 73, which connects the actuating link 70 to the main frame 10, is disposed between the discharge boom pivot pin 31 and the cranks 55, 56. In the preferred embodiment of the invention the pin 73 is spaced from the pivot pin 31 in the direction of the discharge boom. In the operation of the discharge boom 32, wherein it is swung laterally of the main frame 10, the pivot pins 57, on which the cranks 55, 56 are mounted for oscillation, each moves through a circular arc having as its center a point on the axis of the pin 31, while the connecting pin 63, which connects the actuating link 70 to the cranks 55, 56, moves through a circular arc having as its center a point on the axis of the pin 73, being constrained to this path by the actuating link 70, which swings on the fixed pivot pin 73. Due to the location of the pin 73, the radius of the circular arc through which the connecting pin 63 moves, will be less than the radii of the circular arcs through which the pins 57 move. Thus, referring to Figs. 2 and 3, it is seen that the kinematics of the linkage system is such that when the discharge boom 32 is swung laterally of the main frame 10 of the loading machine, the cranks 55, 56 will be oscillated from their positions shown in Fig. 2 to the positions shown in Fig. 3, in a direction moving the ball connector ends 60 of the cranks 55, 56 towards the end of the discharge boom.

This oscillatory motion of the cranks 55, 56 is transmitted to the push rods 52 by the ball 60 and socket 61 connections between the cranks 55, 56 and the push rods 52. The oscillatory movement of the cranks 55, 56 will be translated into a reciprocatory motion of the push rods 52, moving the idler shaft 34 in a direction towards the end of the discharge boom 32, being thereby operative to take up any slack in the conveying element 25 that occurs as a result of the swinging of the discharge boom 32 and, thereby maintaining the tension in the conveying element 25. When the discharge boom 32 is swung back to its normal position, in which it forms a straight line extension of the loading machine, the path of the conveying element 25 is lengthened and there will be automatically set up in the conveying element 25 a tension force tending to pull the idler shaft 34 in the direction of the main frame 10 of the machine. This force will operate to restore the push rods 52 and the cranks 55, 56 to their original positions and will accompany the action of the actuating link 70, which also operates to restore the elements of the linkage system to their original positions as shown in Fig. 2.

The supporting structure for the conveyor bed 29 is hingedly secured on the main frame 10 by a pair of arms 79 connected to the ends of a laterally extending, horizontal hinge pin 80 disposed on the main frame 10 behind the hinge pin 16 which supports the material receiving means 15. Conventional hydraulic cylinder and piston means is contained within the main frame 10 to elevate the material conveyor by swinging the bed 29 in a vertical plane about the hinge pin 80, for the purpose of elevating the discharge boom 32 to conveniently discharge the material to whatever conveyance may be provided for the reception of the same.

In some instances, when the conveyor bed 29 is elevated, it may be desirable to maintain the end of the discharge boom 32 in a substantially horizontal position, and for this purpose the discharge boom 32 is provided with a tail portion 81 that is connected on the discharge boom 32 by a laterally extending horizontal hinge pin 82 that permits the tail portion 81 to be swung in a vertical plane. For the purpose of making this adjustment of the tail portion 81 there is provided a turnbuckle device 83 which includes oppositely extending screw elements 84 connected to the tail portion 81 and the front portion 85 of the discharge boom 32. The screw elements are threaded into blocks 86 which are pivotally supported by means of pins 87 rotatably secured to the boom tail portions 81 and the boom front portion 85. One such turnbuckle device is provided on each side of the discharge boom 32, and these devices are operated manually to set the position of the tail portion 81 as may be dictated by the operating conditions in the mine.

Referring to Fig. 4, it is seen that the push rods 52 are reciprocably supported on the discharge boom tail portion 81, while the cranks 55, 56 for operating the push rods 52 are supported by the pins 57 on the discharge boom front portion 85. The ball and socket type connection 60, 61 between the cranks 55, 56 and the push rods 52, permit universal movement between the connecting portions of the cranks 55, 56 and the push rods 52, and accordingly, when the discharge boom tail portion 81 is adjusted by means of the turnbuckle devices 83, there is no interference with the operation of the linkage mechanism for adjusting the idler shaft 34 at the time that the discharge boom 32 is swung laterally with respect to the main frame 10 of the loading machine.

The loading machine described herein includes a novel structure for taking up the slack in the conveying element which moves the material from the material receiving end of the machine to the material discharge boom of the machine, to maintain the proper tension in the conveying element. The discharge boom is connected to the main frame of the machine on an upright pivot axis, permitting the boom to swing from one side to the other laterally of the loading machine. The conveying element extends the length of the machine including the discharge boom, with the run of the conveying element intersecting the pivot axis on which the discharge boom swings, whereby the run of the conveying element is shortened when the discharge boom is swung laterally of the machine. This condition gives rise to slack in the conveying element which must be taken up in order to maintain the proper tension in the conveying element for most efficient operation thereof. Accordingly, there is provided by the instant invention means which is automatically operable upon swinging the discharge boom to take up the slack in the conveying element to maintain the proper tension. The novel slack take up means comprises an operating linkage on the discharge boom which effects the necessary adjustment of the conveying element, and an actuating link pivotally connected to the main frame of the machine and connected to the operating linkage to actuate the operating linkage as the discharge boom is swung.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a materials conveying machine having a main frame, a materials discharge boom at one end of the main frame forming an extension thereof, a conveyor extending along the main frame and the discharge boom to move materials to the discharge boom, said discharge boom being pivotally connected to the main frame on an upright axis to swing to one side or the other relatively to the main frame, said conveyor traveling along a path intersecting said upright axis whereby the path of the conveyor is shortened when the discharge boom is swung relatively to the main frame, said discharge boom including a shaft about which the conveyor is trained, adjustable means mounting the shaft on the discharge boom, a linkage for operating the adjustable mounting means to take up slack in the conveyor to maintain the tension in the conveyor, an actuating link connected between the main frame and said linkage, said actuating link being pivotally connected to the main frame at a point between the upright axis on which the boom is pivotally connected to the main frame and said linkage to automatically actuate the linkage as the discharge boom is swung relatively to the main frame.

2. In a materials conveying machine having a main frame, a materials discharge boom at one end of the main frame forming an extension thereof, a conveyor extending along the main frame and the discharge boom to move materials to the discharge boom, said discharge boom being pivotally connected to the main frame on an upright axis to swing to one side or the other relatively to the main frame, said conveyor traveling along a path intersecting said upright axis whereby the path of the conveyor is shortened when the discharge boom is swung relatively to the main frame, said discharge boom including a shaft about which the conveyor is trained, reciprocable means adjustably mounting the shaft on the discharge boom, a crank pivotally moutned on the discharge boom for operating the reciprocable means to take up slack in the conveyor to maintain the tension in the conveyor, an actuating link connected to the crank for oscillating the crank and pivotally connected to the main frame between the pivot axes of the discharge boom and the crank to automatically actuate the crank and the reciprocable means as the discharge boom is swung relatively to the main frame.

3. In a materials conveying machine having a main frame, a materials discharge boom at one end of the main frame forming an extension thereof, a conveyor extending along the main frame and the discharge boom to move materials to the discharge boom, said discharge boom being pivotally connected to the main frame on an upright axis to swing to one side or the other relatively to the main frame, said discharge boom including a tail portion connected on a horizontal axis and means for adjusting the position of the tail portion in a vertical plane, said conveyor traveling along a path intersecting said upright axis whereby the path of the conveyor is shortened when the discharge boom is swung relatively to the main frame, said discharge boom including a shaft at the end of the tail portion about which the conveyor is trained, means adjustably mounting the shaft on the tail portion to take up slack in the conveyor to maintain the tension in the conveyor, a pair of push rods connected one to each end of the shaft, said push rods being reciprocably mounted on the tail portion of the discharge boom for adjusting the shaft, a pair of oppositely directed cranks pivotally mounted on the discharge boom, said cranks being connected one to each of the push rods to reciprocate said push rods in unison, an actuating link connected to said oppositely directed cranks and connected to the main frame to automatically operate the cranks and the push rods as the discharge boom is swung relatively to the main frame, the connection of the cranks to the push rods comprising a ball joint permitting adjustment of the discharge boom tail portion.

4. In a materials conveying machine having a main frame, a materials discharge boom at one end of the main frame forming an extension thereof, a conveyor extending along the main frame and the discharge boom to move materials to the discharge boom, said discharge boom being pivotally connected to the main frame to swing to one side or the other relatively to the main frame, said discharge boom including a shaft about which the conveyor is trained, adjstable means mounting the shaft on the discharge boom, a linkage for operating the adjustable mounting means to take up slack in the conveyor to maintain the tension in the conveyor, an actuating link connected between the main frame and said linkage, said actuating link being pivotally connected to the main frame at a point between the axis of the pivotal connection of the discharge boom to the main frame and said linkage to automatically actuate the linkage as the discharge boom is swung relatively to the main frame.

5. In a materials conveying machine having a main frame, materials discharging means at one end of the main frame, a conveyor extending along the main frame and the discharging means adapted to move materials to the discharging means, said discharging means comprising a pivoted section forming an extension of the main frame and adapted to swing relatively to the main frame on an upright axis, means to take up slack in the conveyor to maintain the tension in the conveyor as the pivoted section is swung relatively to the main frame, means on the pivoted section for operating the slack take up means, and an actuating link connected between the main frame and the operating means on the pivoted section, said actuating link being pivotally connected to the main frame at a point between said upright axis on which the pivoted section is joined to the main frame and said operating means to automatically actuate the operating means as the pivoted section is swung relatively to the main frame.

6. A conveyor comprising a main frame, a pivot section connected to the main frame on an upright pivot axis forming an extension of the main frame and adapted to swing to one side or the other relatively to the main frame, said pivot section including a shaft, an endless conveyor means trained about the shaft and having its run extending along the main frame and the pivot section with its run intersecting said upright pivot axis whereby the path of the conveyor is shortened when the pivot section is swung on its pivot axis, means adjustably mounting the shaft to take up slack in the conveyor means to maintain the tension in the conveyor means, a pair of push rods connected one to each end of the shaft, said push rods being reciprocably mounted on the pivot section one at either side thereof for adjusting the shaft, a pair of oppositely directed cranks pivotally mounted on the pivot section and extending from the center of the pivot section to the sides thereof, said cranks being connected on to each of the push rods to reciprocate said push rods in unison, a pin connecting said cranks near the center of the pivot section for simultaneous oscillation, an actuating link connected to said connecting pin and connected to the main frame on a pivot pin disposed between the pin connecting said cranks and the pivot axis of the pivot section, said pivot pin being spaced from the pivot axis, and the pin connecting the cranks swinging through an arc having a smaller radius than the arcs through which the pivot axes of the cranks move as the pivot section is swung relatively to the main frame thereby automatically oscillating the cranks as the pivot section is swung relatively to the main frame.

7. A conveyor comprising a main frame and a pivot section forming an extension of the main frame and adapted to swing relatively to the main frame, said pivot section including a shaft, an endless conveyor means trained about the shaft and having its run extending along the main frame and the pivot section, means adjustably mounting the shaft to take up slack in the conveyor means to maintain the tension in the conveyor means, a pair of push rods connected one to each end of the shaft, said push rods being reciprocably mounted on the pivot section one at either side thereof for adjusting the shaft, a pair of oppositely directed cranks pivotally mounted on the pivot section and extending from the center of the pivot section to the sides thereof, said cranks being connected one to each of the push rods to reciprocate said push rods in unison, a pin connecting said cranks near the center of the pivot section for simultaneous oscillation, an actuating link connected to said connecting pin and connected to the main frame on a pivot pin disposed between the pin connecting said cranks and the pivot axis of the pivot section, said pivot pin being spaced from the pivot axis of the pivot section, and the pin connecting the cranks swinging through an arc having a smaller radius than the arcs through which the pivot axes of the cranks move as the pivot section is swung relatively to the main frame thereby automatically oscillating the cranks as the pivot section is swung relatively to the main frame.

8. A conveyor comprising a main frame and a pivot section forming an extension of the main frame and adapted to swing relatively to the main frame, said pivot section including a shaft, an endless conveyor means trained about the shaft and having its run extending along the main frame and the pivot section, means adjustably mounting the shaft to take up slack in the conveyor means to maintain the tension in the conveyor means, a pair of push rods connected one to each end of the shaft, said push rods being reciprocably mounted on the pivot section for adjusting the shaft, a pair of oppositely directed cranks pivotally mounted on the pivot section, said cranks being connected one to each of the push rods to reciprocate said push rods in unison, a pin connecting said cranks for simultaneous and opposite oscillation, an actuating link connected to said connecting pin and connected to the main frame on a pivot pin disposed between the pivot axis of the pivot section and the pin connecting said cranks to automatically operate the cranks and the push rods as the pivot section is swung relatively to the main frame.

9. A conveyor comprising a main frame and a pivot section forming an extension of the main frame and adapted to swing relatively to the main frame, said pivot section including a shaft, an endless conveyor means trained about the shaft and having its run extending along the main frame and the pivot section, means adjustably mounting the shaft to take up slack in the conveyor means to maintain the tension in the conveyor means, a pair of push rods connected one to each end of the shaft, said push rods being reciprocably mounted on the pivot section for adjusting the shaft, a pair of oppositely directed cranks pivotally mounted on the pivot section, said cranks being connected one to each of the push rods to reciprocate said push rods in unison, an actuating link connected to said oppositely directed cranks and connected to the main frame to automatically operate the cranks and the push rods as the pivot section is swung relatively to the main frame.

10. A conveyor comprising a main frame and a pivot section forming an extension of the main frame and adapted to swing relatively to the main frame, said pivot section including a tail portion connected on a horizontal axis and means for adjusting the position of the tail portion in a vertical plane, said pivot section including a shaft at the end of the tail portion, an endless conveyor means trained about the shaft and having its run extending along the main frame and the pivot section, means adjustably mounting the shaft to take up slack in the conveyor means to maintain the tension in the conveyor means, a pair of push rods connected one to each end of the shaft, said push rods being reciprocably mounted on the tail portion of the pivot section for adjusting the shaft, a pair of oppositely directed cranks pivotally mounted on the pivot section, said cranks being connected one to each of the push rods to reciprocate said push rods in unison, an actuating link connected to said oppositely directed cranks and connected to the main frame to automatically operate the cranks and the push rods as the pivot section is swung relatively to the main frame, the connection of the cranks to the push rods comprising a ball joint permitting adjustment of the pivot section tail portion.

11. A conveyor comprising a main frame, a pivot section connected to the main frame on an upright pivot axis forming an extension of the main frame and adapted to swing to one side or the other relatively to the main frame, said pivot section including a shaft, an endless conveyor means trained about the shaft and having its run extending along the main frame and the pivot section and intersecting said pivot axis whereby the path of the conveyor is shortened when the pivot section is swung on its pivot axis, means adjustably mounting the shaft to take up slack in the conveyor means to maintain the tension in conveyor means, a push rod connected to the shaft, said push rod being reciprocably mounted on the pivot section for adjusting the shaft, a crank pivotally mounted on the pivot section and connected to the push rod to reciprocate said push rod, an actuating link connected to said crank and pivotally connected to the main frame, the pivotal connection of the actuating link to the main frame being spaced from the pivot axis of the pivot section in the direction of the crank to automatically operate the crank and the push rod as the pivot section is swung relatively to the main frame.

12. A conveyor comprising a main frame and a pivot section forming an extension of the main frame and adapted to swing relatively to the main frame, said pivot section including a shaft, an endless conveyor means trained about the shaft and having its run extending along the main frame and the pivot section, means adjustably mounting the shaft to take up slack in the conveyor means to maintain the tension in the conveyor means, a push rod connected to the shaft, said push rod being reciprocably mounted on the pivot section for adjusting the shaft, a crank pivotally mounted on the pivot section and connected to the push rod to reciprocate said push rod, an actuating link connected to said crank and pivotally connected to the main frame, the pivotal connection of the actuating link to the main frame being spaced from the pivoting axis of the pivot section in the direction of the crank to automatically operate the crank and the push rod as the pivot section is swung relatively to the main frame.

13. In a conveyor comprising a main frame and a pivot section forming an extension of the main frame, pivot means connecting the pivot section to the main frame, the pivot section being adapted to swing relatively to the main frame, said pivot section including a shaft, an endless conveyor means trained about the shaft and having its run extending along the main frame and the pivot section, means adjustably mounting the shaft to take up slack in the conveyor means to maintain the tension in the conveyor means, said pivot section including a linkage connected to the shaft for adjusting the shaft, and an actuating link connected to the linkage and pivotally connected to the main frame between said pivot means and the linkage for automatically actuating the linkage as the pivot section is swung relatively to the main frame.

14. In a conveyor comprising a main frame and a pivot section forming an extension of the main frame, pivot means connecting the pivot section to the main frame, said pivot section being adapted to swing relatively to the main frame, conveyor means having its run extending along the main frame and the pivot section, means on the pivot section to take up the slack in the conveyor means to maintain the tension in the conveyor means, and an actuating link pivotally connected to the main frame at a point between the pivot means connecting the pivot section to the main frame and the slack take up means and connected to the slack take up means on the pivot section for automatically adjusting the conveyor means as the pivot section is swung relatively to the main frame.

15. A conveyor comprising a main frame and a pivot section forming an extension of the main frame and adapted to swing relatively to the main frame, said pivot section including a shaft, an endless conveyor means trained about the shaft and having its run extending along the main frame and the pivot section, means adjustably mounting the shaft to take up slack in the conveyor, means to maintain the tension in the conveyor means, means for adjusting the shaft mounted on the pivot section and connected to the ends of the shaft, a pair of oppositely directed cranks pivotally mounted on the pivot section, said cranks being connected to said adjusting means, an actuating link connected to said oppositely directed cranks and connected to the main frame to automatically operate the cranks and the adjusting means as the pivot section is swung relatively to the main frame.

References Cited in the file of this patent
UNITED STATES PATENTS

| | | |
|---|---|---|
| 890,021 | Camp | June 9, 1908 |
| 2,388,385 | Cartlidge | Nov. 6, 1945 |
| 2,646,871 | Lundquist | July 28, 1953 |
| 2,690,834 | Lundquist | Oct. 5, 1954 |
| 2,744,614 | Sibley | May 8, 1956 |